United States Patent [19]

Fujikawa et al.

[11] 4,448,341

[45] May 15, 1984

[54] AUTOMATIC VEHICLE-BODY ASSEMBLING APPARATUS

[75] Inventors: Tsuneo Fujikawa, Ebina; Kazuyoshi Kamio, Yokohama; Haruyoshi Takagishi, Yamato, all of Japan

[73] Assignee: Nissan Motor Company, Limited, Yokohama, Japan

[21] Appl. No.: 329,874

[22] Filed: Dec. 11, 1981

[30] Foreign Application Priority Data

Dec. 16, 1980 [JP] Japan ................. 55-177808

[51] Int. Cl.³ ............... B23K 37/04; B23K 11/36; B62D 65/00
[52] U.S. Cl. .................... 228/45; 228/4.1; 228/47; 219/80; 219/87; 29/568
[58] Field of Search ............ 29/429, 469, 568, 464; 228/4.1, 6 R, 45, 47; 219/80, 87

[56] References Cited

U.S. PATENT DOCUMENTS

| | | | |
|---|---|---|---|
| 4,162,387 | 7/1979 | DeCandia | 219/80 X |
| 4,267,424 | 5/1981 | Shimatake et al. | 228/45 |
| 4,392,601 | 7/1983 | Fujikawa et al. | 228/4.1 |
| 4,404,451 | 9/1983 | Niikawa et al. | 219/80 |

FOREIGN PATENT DOCUMENTS

| | | | |
|---|---|---|---|
| 123348 | 10/1978 | Japan | 219/87 |
| 103755 | 8/1979 | Japan | |
| 126388 | 9/1980 | Japan | 219/87 |
| 1485055 | 9/1977 | United Kingdom | |
| 1564669 | 4/1980 | United Kingdom | |
| 2075437 | 11/1981 | United Kingdom | |

OTHER PUBLICATIONS

Weule et al., Journal *Automobil-Industrie*, April, 1980, pp. 55-61 (see especially Figure 11). (Zeltschrift-Nr. 7356, Johr:7980,Heft 4).

*Primary Examiner*—Kenneth J. Ramsey
*Attorney, Agent, or Firm*—Lane, Aitken & Kananen

[57] ABSTRACT

Herein disclosed is an automatic vehicle-body assembling apparatus for automatically welding together an engine compartment assembly, a front floor assembly and a rear floor assembly to constitute a vehicle floor structure of an automotive vehicle, each of the engine compartment and front and rear floor assemblies being composed of a plurality of component members, comprising a frame structure, lower and upper working stations including lower and upper carrier means movable in lateral directions of the frame structure, at least two jig assemblies each operative to hold in position the engine compartment and front and rear floor assemblies during each cycle of operation, the jig assemblies being carried on the carrier means of one of the lower and upper working stations, and at least two welding units each operative to weld together the engine compartment and front and rear floor assemblies during each cycle of operation, the jig assemblies being movable in a lateral direction of the frame structure alternately between a predetermined operative position within the frame structure and a predetermined outermost lateral position, the welding units being movable in a lateral direction of the frame structure alternately between a predetermined operative position within the frame structure and a predetermined outermost lateral position.

8 Claims, 12 Drawing Figures

FIG.8

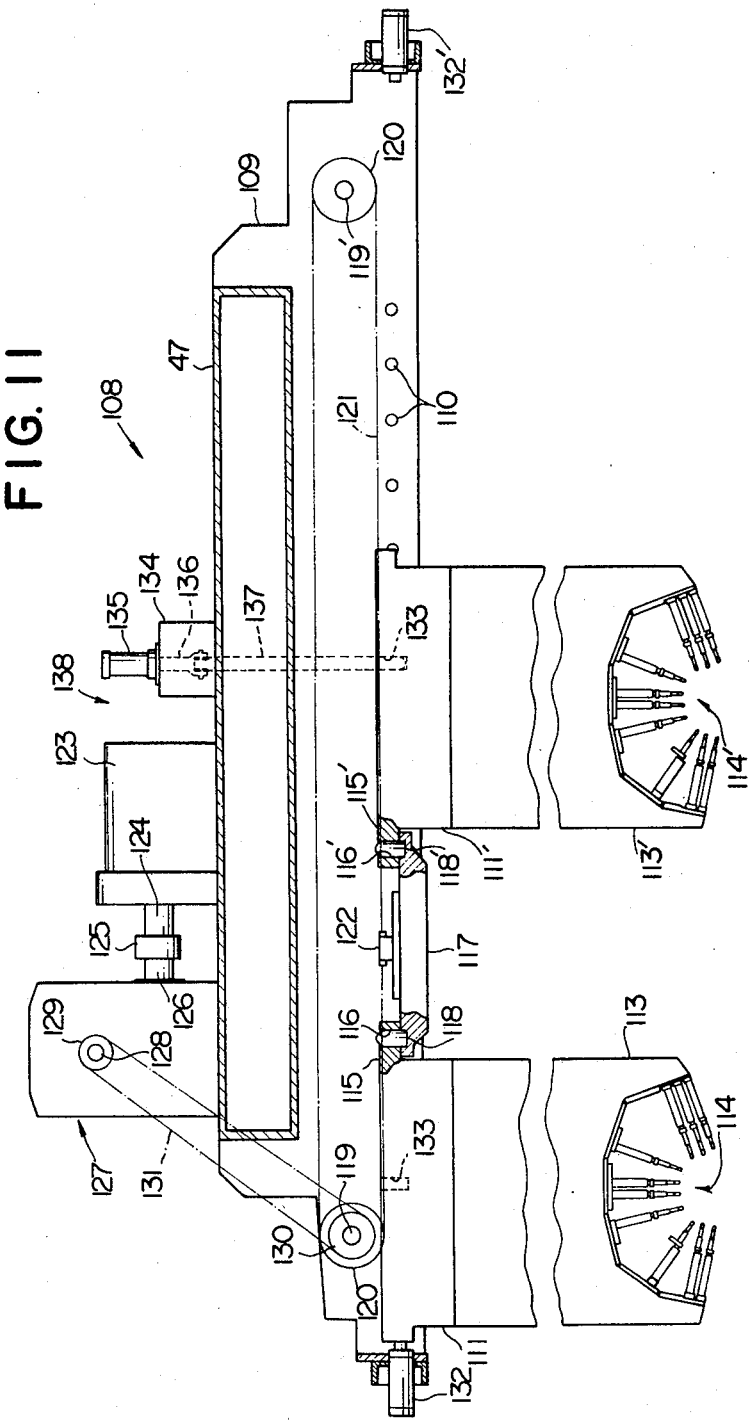

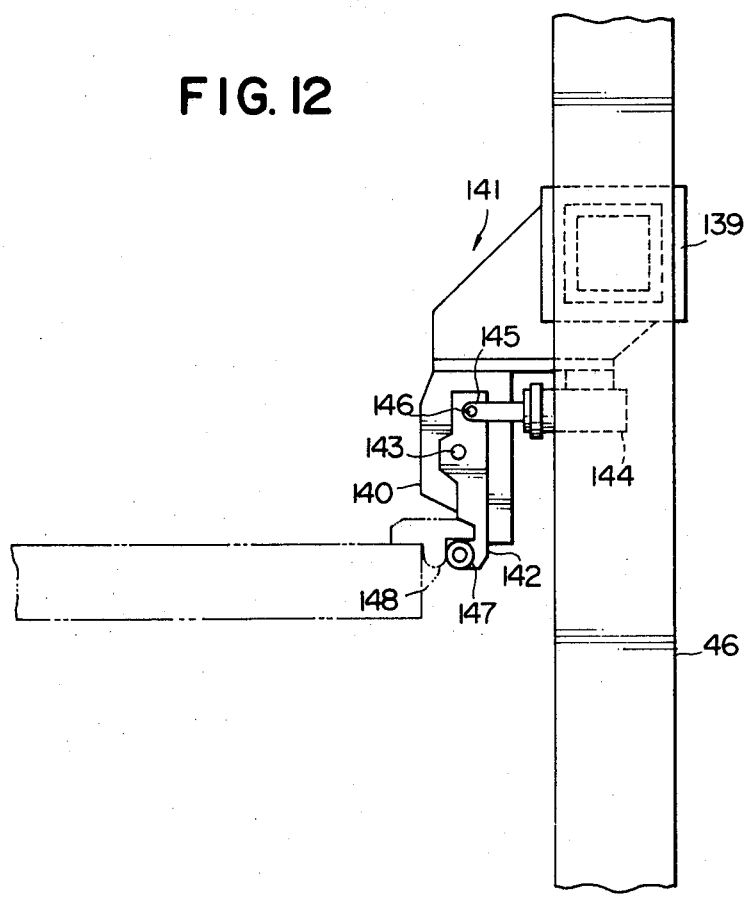

AUTOMATIC VEHICLE-BODY ASSEMBLING APPARATUS

FIELD OF THE INVENTION

The present invention relates to an automatic vehicle-body assembling apparatus for assembling or, more particularly, welding together an engine compartment assembly, a front floor assembly, and a rear floor assembly to constitute a floor structure of an automotive vehicle.

BACKGROUND OF THE INVENTION

A conventional automatic vehicle-body assembling apparatus of the nature above specified is composed solely of a number of multi-spot welding machines arranged along an assembly line. Each of these welding machines includes positioning means adapted to hold together a plurality of component assemblies to constitute a vehicle floor structure and jig units including spot welding heads for spot welding together the component assemblies thus positioned with respect to each other. In this instance, the jig units are arranged so that the welding heads are operative to have the component assemblies of the vehicle floor structure spot welded simultaneously at a number of locations of the component assemblies. The jig units of the welding machine are designed depending upon the types, models and/or makes of the automotive vehicles to be manufactured and, for this reason, must be utilized for the assembling of vehicle floor structures of a single specified type, model or make. When the automotive vehicles to be supplied from an automotive manufacturer are to be re-modelled or modified in type or make, therefore, the existing assembly line which has been put to use sometimes becomes useless so that it may be required for the automotive manufacturer to have the existing assembly line supplanted by an up-to-date version of the assembly line or shut down for an extended period of time until the jig units which have been used in the obsolete assembly line are completely exchanged with new ones. Problems have therefore been encountered in that a vast amount of investment is required on the part of the manufacturer or in that the labor and production equipment are wasted for a long period of time.

To save the production costs of automotive vehicles, on the other hand, attempts are being made in the automotive industry to assemble vehicle bodies of different models, types and/makes in a single assembly line. One of such attempts is taught in the applicants' copending Japanese Patent Application Publication No. 54-103,755 dated Aug. 15, 1979. In this patent application, a welding machine is disclosed having jig or fixture assemblies which can be easily exchanged with other ones depending upon the models, types and/or makes of the vehicle bodies to be assembled. In the improved version of assembling systems, however, the jig or fixture assemblies to be put to use for assembling a body structure for an automotive vehicle of one model, type or make are brought into operative positions thereof by means of manipulative means which differ from the manipulative means by which the jig or fixture assemblies are to be handled. Limitations have therefore been encountered in exchanging between the two or more manipulative means quickly and efficiently.

The present invention contemplates elimination of these problems by provision of an improved automatic vehicle body welding apparatus.

SUMMARY OF THE INVENTION

In accordance with the present invention, there is provided an automatic vehicle-body assembling apparatus for automatically welding together an engine compartment assembly, a front floor assembly, and a rear floor assembly to constitute a vehicle floor structure of an automotive vehicle, each of the engine compartment and front and rear floor assemblies being composed of a plurality of component members, comprising a frame structure having a fore-and-aft direction in which the engine compartment and front and rear floor assemblies and the vehicle floor structure are to be conveyed through the apparatus and a lateral direction horizontally perpendicular to the fore-and-aft direction, the frame structure including lower and upper base frames extending in a lateral direction of the frame structure at the bottom and top, respectively, of the frame structure, lower and upper working stations supported on the lower and upper base frames, respectively, each of the lower and upper working stations including carrier means movable on lower and upper base frames in lateral directions of the frame structure, at least two jig assemblies each operative to hold in position the engine compartment and front and rear floor assemblies during each cycle of operation, the jig assemblies being carried on the carrier means of one of the lower and upper working stations, at least two welding units each operative to weld together the engine compartment and front and rear floor assemblies during each cycle of operation, the welding units being carried on the carrier means of the other of the lower and upper working stations, first drive means operative to drive the carrier means of the lower working station to move in a lateral direction of the frame structure, and second drive means operative to drive the carrier means of the upper working station to move in a lateral direction of the frame structure, the jig assemblies being movable in a lateral direction of the frame structure alternately between a predetermined operative position within the frame structure and a predetermined outermost lateral position as the carrier means carrying the jig assemblies are driven by one of the first and second drive means, the welding units being movable in a lateral direction of the frame structure alternately between a predetermined operative position within the frame structure and a predetermined outermost lateral position as the carrier means carrying the welding units are driven by one of the first and second drive means. The apparatus according to the present invention may further comprise lifting means operative to move the carrier means of the lower working station upwardly and downwardly over the lower base frame, the carrier means of the lower working station being vertically movable between a predetermined lowermost limit position and a predetermined uppermost limit position. The jig assemblies may be carried on the carrier means of the lower working station and in which the welding units are carried on the carrier means of the upper working station. Each of the jig assemblies may be arranged to be movable into the predetermined operative position when the above mentioned lifting means is held in a condition having the carrier means of the lower working station held in the uppermost limit position thereof. In this instance, the carrier means of the lower working station may comprise two carrier blocks respectively having the jig assemblies carried thereon, and coupling means having carrier blocks disconnectably coupled together.

BRIEF DESCRIPTION OF THE DRAWINGS

The features and advantages of an automatic vehicle-body assembling apparatus according to the present invention will be understood more clearly from the following description in which:

FIG. 8 is a fragmentary longitudinal sectional view showing, partly in side elevation and to an enlarged scale, a lower working station of the multi-spot welding machine illustrated in FIGS. 6 and 7;

FIG. 11 is a rear elevation view showing, partly in cross section and to an enlarged scale, an upper working station of the multi-spot welding machine illustrated in FIGS. 6 and 7; and FIG. 12 is a rear elevation view of stop means included in the multi-spot welding machine illustrated in FIGS. 6 to 9.

DESCRIPTION OF THE PREFERRED EMBODIMENT

Description will be hereinafter made with respect to the drawings which show a preferred embodiment of a multi-shift automatic vehicle-body assembling apparatus according to the present invention. The embodiment of the present invention herein shown is assumed, by way of example, as being adapted for the selective assembling of the floor structures of automotive vehicles of two different models which are herein referred to as models "A" and "B". Furthermore, each of the floor structures to be assembled by the use of the embodiment of the apparatus according to the present invention is assumed, also by way of example, as being composed of an engine compartment assembly, a front floor assembly, and a rear floor assembly. The engine compartment assembly, front floor assembly and rear floor assembly are assembled or, more specifically, welded together to form an integral floor structure on a main assembly line 1 constituting the apparatus embodying the present invention as schematically illustrated in FIG. 1 of the drawings.

Figure 1:
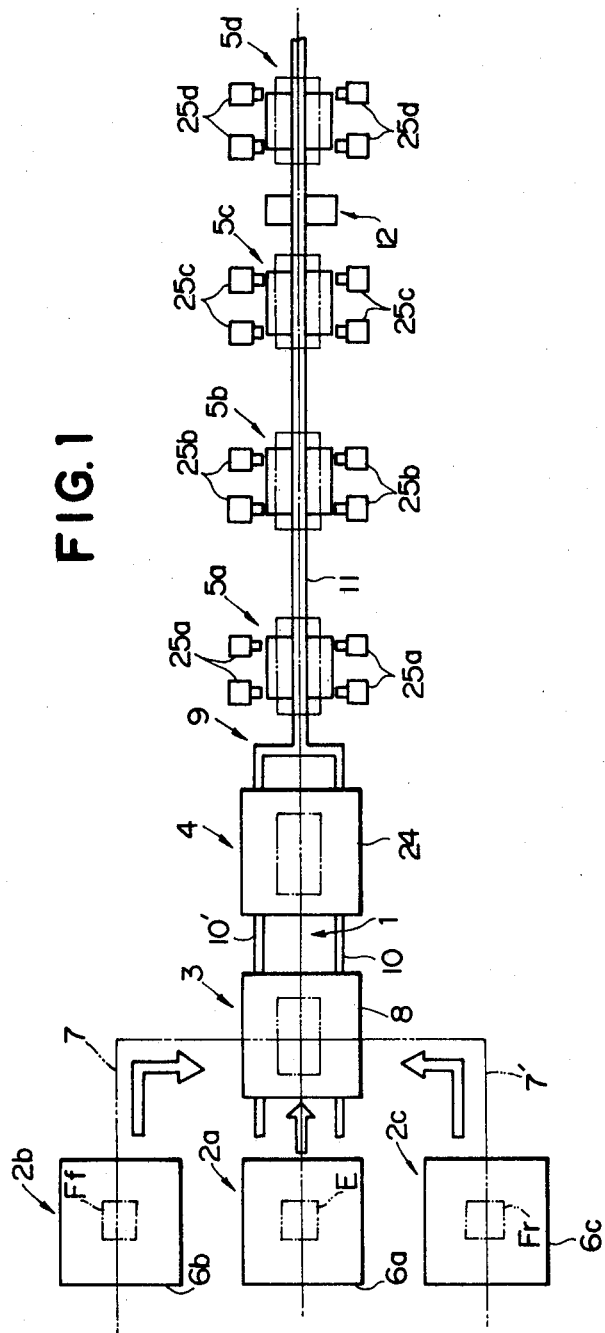
FIG. 1 is a schematic plan view showing the overall arrangement of a preferred embodiment of an assembling apparatus according to the present invention.

As will be seen from FIG. 1, the assembly line 1 comprises a plurality of assembling stages which consist of first, second and third initial assembling stages 2a, 2b and 2c, a positioning stage 3, a primary assembling stage 4 subsequent to the positioning stage 3, and first, second, third and fourth secondary assembling stages 5a, 5b, 5c and 5d subsequent in series to the primary assembling stage 4. The first initial assembling stage 2a is located at the upstream end of the main assembly line 1 and has provided therein a multi-spot welding machine 6a adapted to have a plurality of component members of an engine compartment assembly of a vehicle body provisionally or tack welded together to form a tentative engine compartment assembly E. On the other hand, the second and third initial assembling stages 2b and 2c are located in parallel with the first initial assembling stage 2a and have provided therein multi-spot welding machines 6b and 6c, respectively. The multi-spot welding machine 6b provided in the second initial stage 2b is adapted to have component members of a front floor assembly of a vehicle body provisionally welded together to form a tentative front floor assembly Ff. Likewise, the third initial assembling stage 2c has provided therein a multi-spot welding machine 6c adapted to have component members of a rear floor assembly of a vehicle body provisionally or tack welded together to form a tentative rear floor assembly Fr. The second and third initial assembling stages 2b and 2c thus arranged are joined to the main assembly line 1 through subsidiary assembly lines 7 and 7', respectively. The tentative front and rear floor assemblies Ff and Fr formed in the second and third initial assembling stages 2b and 2c, respectively, are thus conveyed by suitable conveyor means (not shown) and are correctly positioned with respect to the tentative engine compartment assembly E conveyed to the stage 3 from the first initial assembling stage 2a. In the positioning stage 3 is thus provided a jig assembly 8 adapted to have the engine compartment assembly E and the front and rear floor assemblies Ff and Fr positioned with respect to one another in the stage 3. The positioning stage 3, primary assembling stage 4 and secondary assembling stages 5a, 5b, 5c and 5d are arranged in series along a reciprocative shuttle bar 9 horizontally extending in parallel with the main assembly line 1 downstream of the first initial assembling stage 2a. As schematically illustrated in FIG. 1, the shuttle bar 9 has a pair of upstream branch portions 10 and 10' horizontally spaced apart in parallel from each other and longitudinally extending through the positioning and primary assembling stages 3 and 4. The upstream branch portions 10 and 10' of the shuttle bar 9 are conjoined together between the primary assembling stage 4 and the first secondary assembling stage 5a and merge into a single straight downstream portion 11 longitudinally extending through the first, second, third and fourth secondary assembling stages 5a, 5b, 5c and 5d downstream of the primary assembling stage 4 as shown.

As will have been understood from the foregoing description, the apparatus according to the present invention has a fore-and-aft direction parallel with the shuttle bar 9 and a lateral direction horizontally perpendicular to the fore-and-aft direction. The shuttle bar 9 in the embodiment herein shown constitutes longitudinal conveyor means in the apparatus according to the present invention and is driven to move back and forth in a fore-and-aft direction of the apparatus by suitable drive means provided, for example, between the third and fourth secondary assembling stages 5c and 5d as schematically indicated at reference numeral 12 in FIG. 1. As illustrated in detail in FIGS. 2 and 3 of the drawings, the drive means 12 provided in the embodiment of the present invention comprises a stationary pedestal 13 fixedly mounted on the upper surface of a horizontal floor 14 and a reversible electric motor 15 supported on the upper face of the pedestal 13. The motor 15 has an output shaft 16 axially extending in a lateral direction of the apparatus and connected by means of a coupling 17 to the input shaft of a reduction gear unit 18 which is also mounted on the upper face of the pedestal 13. The reduction gear unit 18 in turn has its output shaft connected through a coupling 19 to a drive shaft 20 having opposite axial end portions journaled in bearing members 21 and 21' fixedly mounted on the pedestal 13 as will be seen from FIG. 2. The drive shaft 20 axially extends perpendicularly in non-intersecting relationship to the straight downstream portion 11 of the shuttle bar 9 and has a pinion gear 22 fixedly and coaxially carried thereon. The pinion gear 22 is held in mesh with a toothed rack member 23 which is securely attached to the straight downstream portion 11 of the shuttle bar 9 and which is elongated along the portion 11 of the shuttle bar 9 with a length greater than each of the distances between the adjacent pairs of the stages 3, 4 and 5a to 5d (FIG. 1). When, thus, the motor 15 is in operation driving the drive shaft 20 for rotation in either direction about the axis thereof through the reduction gear unit 18 and the couplings 17 and 19, the pinion gear 22 on the drive shaft 20 drives the rack member 23 and accordingly the shuttle bar 9 to longitudinally move forwardly or backwardly over the floor 14.

Turning back to FIG. 1, the tentative engine compartment assembly E, front floor assembly Ff and rear floor assembly Fr positioned with respect to one another in the positioning stage 3 of the main assembly line 1 are conveyed on the upstream branch portions 10 and 10' of the shuttle bar 9 to the primary assembling stage 4. In the primary assembling stage 4 is provided a multi-spot welding machine 24 which is adapted to have the tentative assemblies E, Ff and Fr provisionally or tack welded together so as to form a tentative vehicle floor structure S. The tentative vehicle floor structure S thus formed in the primary assembling stage 4 is conveyed on the upstream branch portions 10 and 10' of the shuttle bar 9 to the first secondary assembling stage 5a and is stepwise passed on the straight downstream portion 11 of the shuttle bar 9 through the first, second, third and fourth secondary assembling stages 5a, 5b, 5c and 5d successively. The secondary assembling stages 5a, 5b, 5c and 5d have provided therein welding robots or automatically-operated welding machines 25a, 25b, 25c and 25d, respectively, which are adapted to completely weld together the individual component assemblies E, Ff and Fr of the tentative vehicle floor structure S as well as the individual component members of each of the tentative assemblies E, Ff and Fr.

As will be seen from FIGS. 4 and 5 of the drawings, the stages 3, 4 and 5a to 5d of the assembly line 1 are provided in an elongated, furrow-like pit 26 formed in the floor 14 and extending below and in parallel with the shuttle bar 9 in a fore-and-aft direction of the apparatus. The jig assembly 8 of the positioning stage 3 is located in an upstream end portion of the pit 26 and comprises a lifting mechanism which includes a stationary frame structure 27 upstanding from the bottom surface of the pit 26 as shown in FIG. 5 and including members having the upstream branch portions 10 and 10' of the shuttle bar 9 slidably supported thereon. The frame structure 27 has further supported thereon a pair of fluid-operated balancing power cylinders 28 and 28' having their respective cylinder bodies securely mounted on the frame structure 27. The balancing power cylinders 28 and 28' have piston rods 29 and 29', respectively, axially extending upwardly from the cylinder bodies and securely connected at their upper ends to a horizontal lifting platform 30. The lifting mechanism of the jig assembly 8 further comprises a fluid-operated drive power cylinder 31 having its cylinder body also secured to the frame structure 27 and having a piston rod 32 axially extending upwardly from the cylinder body and securely connected at the upper end thereof to the lifting platform 30. The lifting platform 30 is thus movable upwardly and downwardly with respect to the frame structure 27 and the shuttle bar 9 as the piston rod 32 of the drive power cylinder 31 is caused to axially protrude upwardly from the cylinder body or is downwardly retracted into the cylinder body. The balancing power cylinders 28 and 28' are adapted to maintain the lifting platform 30 in a correct horizontal position with respect to the piston rod 32 of the drive power cylinder 31. The lifting platform 30 has mounted thereon a set of jigs or fixtures upstanding from the upper face of the platform 30 and comprising a jig 33 for holding the tentative engine compartment assembly E in position, a jig 34 for holding the tentative front floor assembly Ff in position and a jig 35 for holding the tentative rear floor assembly Fr in position. The jigs 33, 34 and 35 are constructed and arranged in such a manner as to have the engine compartment assembly E, front floor assembly Ff and rear floor assembly Fr correctly positioned with respect to one another with front and rear end portions of the front floor assembly Ff overlapped respectively by a rear end portion of the engine compartment assembly E and a front end portion of the rear floor assembly Fr as indicated by dots-and-dash lines in FIG. 5.

On the other hand, each of the first, second, third and fourth secondary assembling stages 5a, 5b, 5c and 5d (FIG. 1) has provided therein a floor structure lifting mechanism for supporting and vertically moving the tentative vehicle floor structure S being processed in each of the stages 5a to 5d. The respective lifting mechanisms of the secondary assembling stages 5a, 5b, 5c and 5d are essentially similar in effect and, for this reason, only the lifting mechanism of the first secondary assembling stage 5a is shown in FIGS. 4 and 5. As will be seen from FIG. 5, the lifting mechanism of the first secondary assembling stage 5a comprises a stationary frame structure 36 upstanding from the bottom surface of the pit 26 and including members which have the straight downstream portion 11 of the shuttle bar 9 slidably supported thereon. The frame structure 36 has further supported thereon a pair of fluid-operated balancing power cylinders 37 and 37' having their respective cylinder bodies securely mounted on the frame structure 36. The balancing power cylinders 37 and 37' have piston rods 38 and 38', respectively, axially extending upwardly from the cylinder bodies and securely connected at their upper ends to a horizontal lifting platform 39. The lift mechanism of the first secondary assembling stage 5a further comprises a fluid-operated drive power cylinder 40 having its cylinder body also secured to the frame structure 36 and having a piston rod 41 axially extending upwardly from the cylinder body and securely connected at the upper end thereof to the lifting platform 39. The lifting platform 39 is thus movable upwardly or downwardly with respect to the frame structure 36 and the shuttle bar 9 as the piston rod 41 of the drive power cylinder 40 is caused to axially protrude upwardly from or retracted downwardly into the cylinder body. The balancing power cylinders 37 and 37' are adapted to maintain the lifting platform 39 in a correct horizontal position with respect to the piston rod 41 of the drive power cylinder 40. The lifting platform 39 has supported thereon suitable support members 42 and 42' upstanding from the upper face of the platform 39. The support members 42 and 42' are adapted to have supported thereon the tentative vehicle floor structure S composed of the tentative engine compartment assembly E and front and rear floor assemblies Ff and Fr as indicated by dots-and-dash lines in FIGS. 4 and 5. Designated by numerals 43 and 43' in FIGS. 4 and 5 are gun-type welding heads forming part of the welding robots 25a provided in the first secondary assembling stage 5a.

Figure 5:
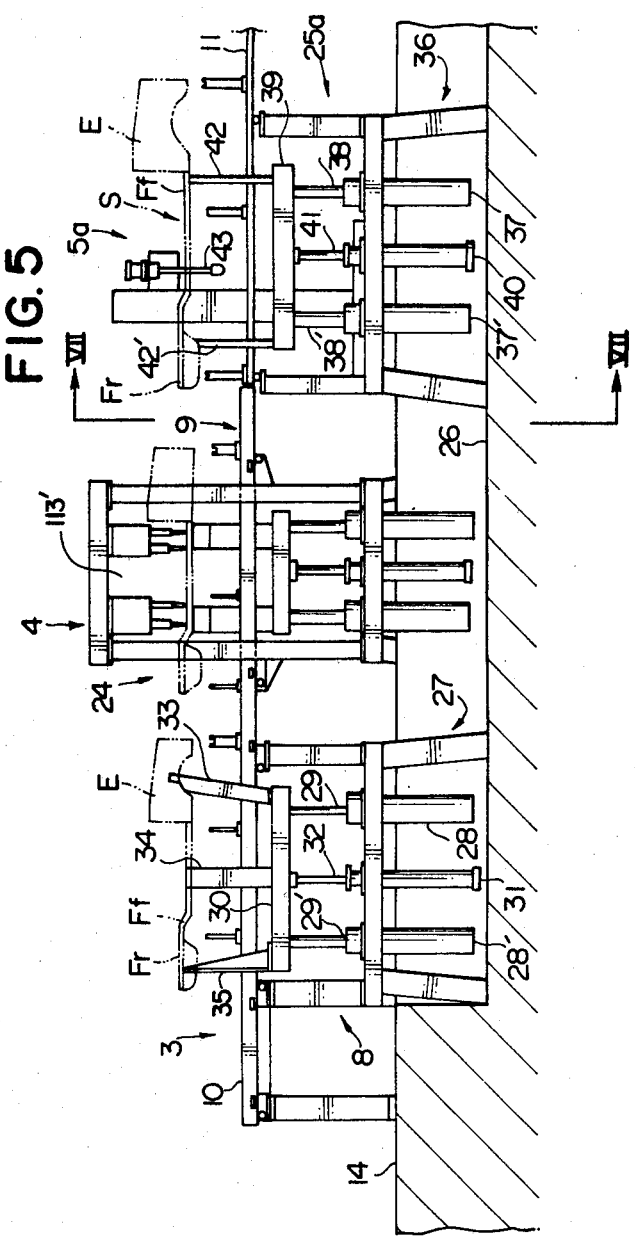
FIG. 5 is a side elevation view of the portion of the assembling apparatus shown in FIG. 4.
Figure 6:
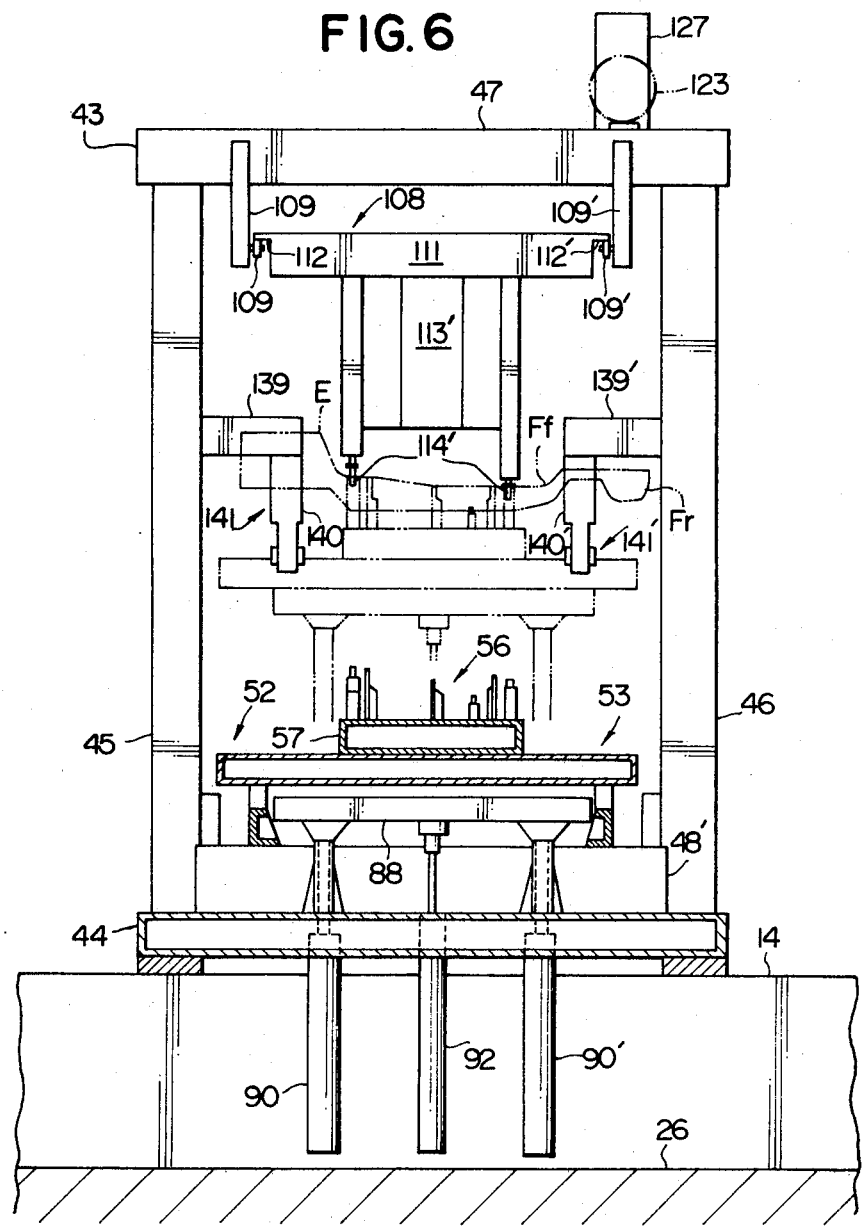
FIG. 6 is a side elevation view of a multi-spot welding machine provided in a primary assembling stage forming part of the assembly line in the embodiment illustrated in FIG. 1.
Figure 7:
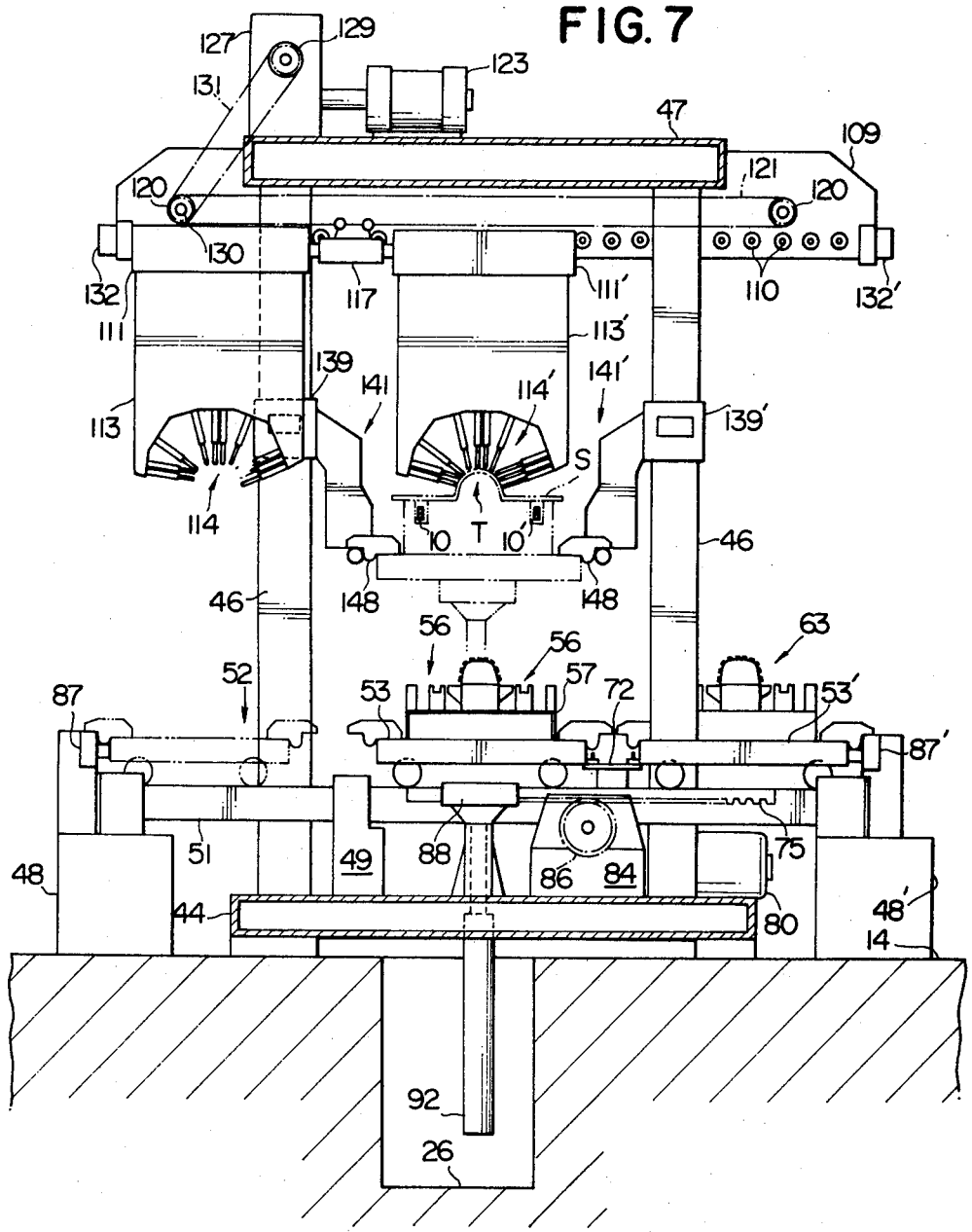
FIG. 7 is a rear elevation view of the multi-spot welding machine illustrated in FIG. 6.

As shown schematically in FIG. 5 and more clearly in FIGS. 6 and 7 of the drawings, the multi-spot welding machine 24 provided in the primary assembling stage 4 comprises a frame structure 43 including a horizontal lower base frame 44 fast on the upper surface of the floor 14 and overriding the pit 26 in a lateral direction of the apparatus. The frame structure 43 further comprises four vertical posts upstanding from the upper surface of the lower base frame 44 and consisting of a pair of front vertical posts 45 and a pair of rear vertical posts 46. The front vertical posts 45 and the rear vertical posts 46 are located at the front and rear corners, respectively, of a rectangular area symmetrical with respect to the shuttle bar 9. The vertical posts 45 and 46 have supported on their upper end faces a horizontal upper base frame 47 which is positioned over the upstream branch portions 10 and 10' of the shuttle bar 9 as will be better seen from FIG. 7. On both sides of the lower base frame 44 are positioned a pair of supporting blocks 48 and 48' which are securely mounted on the upper surface of the floor 14 and which are elongated in fore-and-aft directions of the apparatus. The supporting blocks 48 and 48' are horizontally spaced in parallel from each other in a lateral direction of the apparatus. Furthermore, the lower base frame 44 has supported on the upper face thereof front and rear support frames 49 and 49' which are spaced apart in parallel from each other in a fore-and-aft direction of the apparatus as will be better seen from FIG. 8 of the drawings. A pair of cross beams 50 and 50' (FIG. 8) horizontally extend each partly over the lower base frame 44 in lateral directions of the apparatus and are spaced apart in parallel from each other in a fore-and-aft direction of the apparatus. The front cross beam 50 is securely attached at one end thereof to a front end portion of one supporting block 48 and at the other end thereof to a front end portion of the other supporting block 48' and, likewise, the rear cross beam 50' is securely attached at one end thereof to a rear end portion of the supporting block 48 and at the other end thereof to a rear end portion of the supporting block 48', as will be gathered from the illustrations of FIGS. 7 and 8. The cross beams 50 and 50' have intermediate portions supported on the support frames 49 and 49', respectively, on the lower base frame 44. As will be seen from FIGS. 8 and 9, front and rear guide rails 51 and 51' longitudinally extend in parallel with the cross beams 50 and 50' and are horizontally spaced apart in parallel from the cross beams 50 and 50', respectively, inwardly in a fore-and-aft direction of the apparatus. The front guide rail 51 is securely attached at one end thereof to a front end portion of the supporting block 48 and at the other end thereof to a front end portion of the supporting block 48' and, likewise, the rear guide rail 51' is securely attached at one end thereof to a rear end portion of the supporting block 48 and at the other end thereof to a rear end portion of the supporting block 48'. The guide rails 51 and 51' also have intermediate portions supported on the support frames 49 and 49', respectively, on the lower base frame 44.

Figure 8:
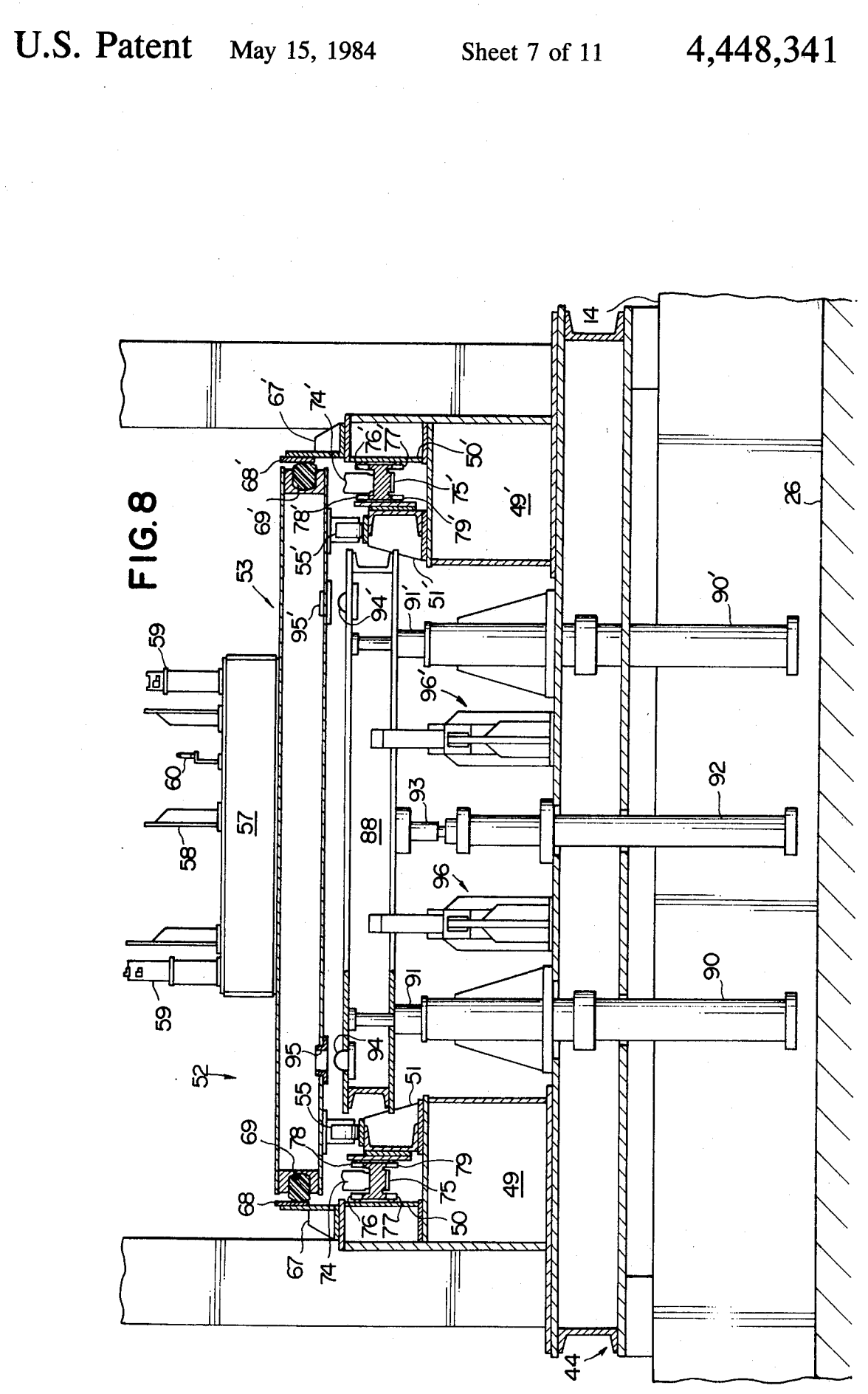
Figure 9:
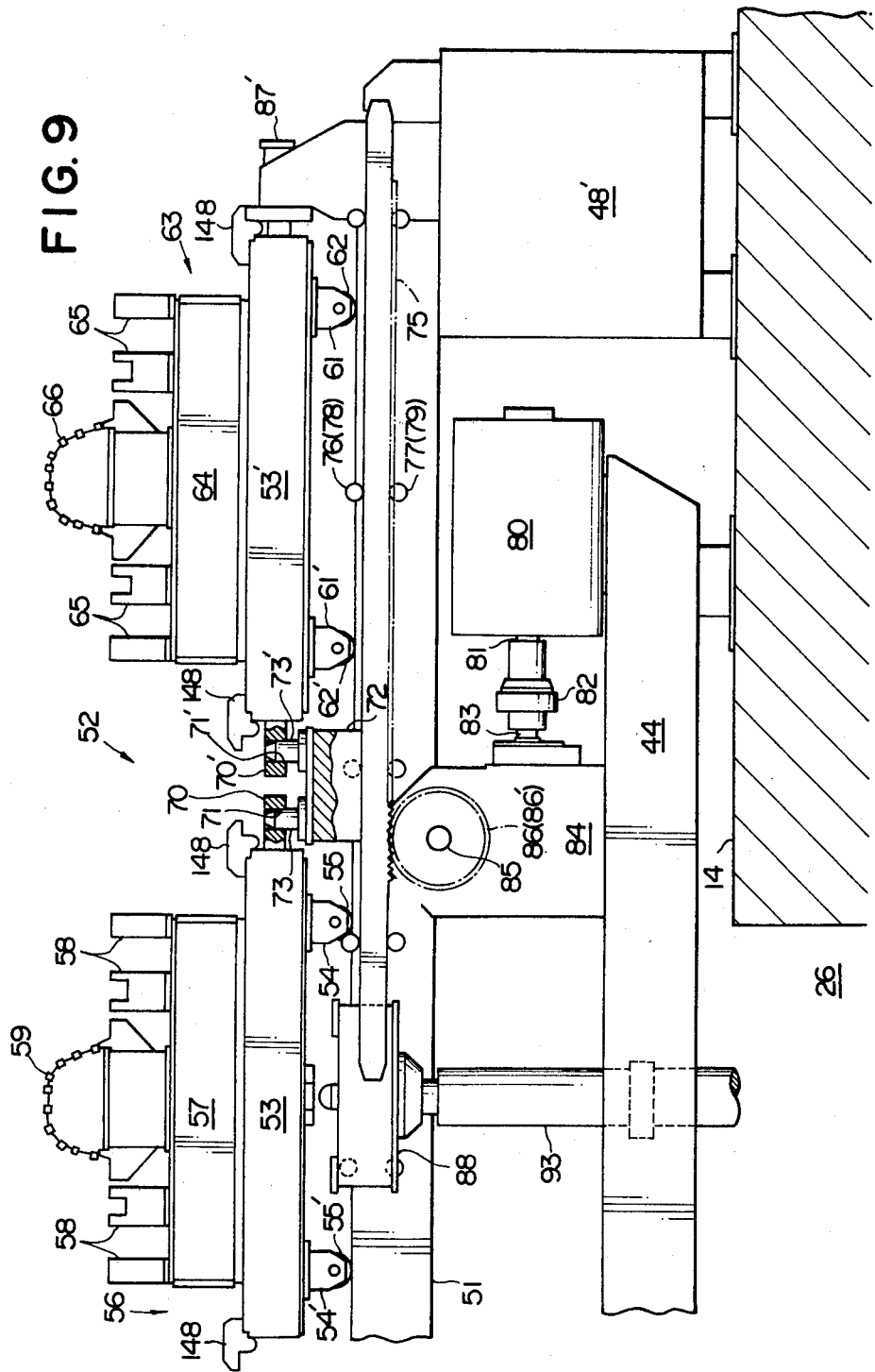
FIG. 9 is a fragmentary cross sectional view showing, partly in rear elevation, the lower working station of the multi-spot welding machine shown in FIG. 8.

The multi-spot welding machine 24 shown in FIGS. 6 to 9 further comprises a lower working station 52 which forms a lower part of the multi-spot welding machine 24 as a whole and which is provided below the horizontal plane on which the shuttle bar 9 longitudinally extends. As shown in FIGS. 8 and 9, the lower working station 52 comprises at least two horizontal carrier blocks which consist of first and second carrier blocks 53 and 53' juxtaposed in a direction parallel with the guide rails 51 and 51'. The first carrier block 53 has two pairs of bracket members 54 and 54' projecting downwardly from the carrier block 53, and two pairs of rollers 55 and 55' rotatably supported by the bracket members 54 and 54', respectively. The rollers 55 and 55' consist of a pair of rollers rollably resting on one of the guide rails 51 and 51' and a pair of rollers rollably resting on the other guide rail. The carrier block 53 thus movable on and along the guide rails 51 and 51' has supported thereon a jig assembly 56 adapted to handle a tentative engine compartment assembly E and front and rear floor assemblies Ff and Fr for an automotive vehicle of, for example, the previously mentioned model "A" and is positioned below the upstream branch portions 10 and 10' of the shuttle bar 9 when such assemblies E, Ff and Fr are to be welded together into a tentative vehicle floor structure S. In the arrangement of FIGS. 8 and 9, such a jig assembly 56 is shown comprising a support frame 57 fixedly mounted on the upper face of the carrier block 53, and a set of jigs or fixtures 58 for supporting engine compartment and front and rear floor assemblies E, Ff and Fr for an automotive vehicle of the model "A". The support frame 57 has further supported thereon a series of backing electrodes 59 to be used for the spot welding of the above mentioned assemblies E, Ff and Fr together as will be described in more detail. Designated by numeral 60 in FIG. 8 is a locating pin also mounted on the support frame 57 for holding any of the assemblies E, Ff and Fr in correct position above the support frame 57. On the other hand, the second carrier block 53' is disposed on one side of the above described first carrier block 53 and has two pairs of bracket members 61 and 61' projecting downwardly from the carrier block 53', and two pairs of rollers 62 and 62' rotatably supported by the bracket members 61 and 61', respectively. The rollers 62 and 62' consist of a pair of rollers rollably resting on one of the guide rails 51 and 51' and a pair of rollers rollably resting on the other guide rail. The carrier block 53' thus movable on and along the guide rails 51 and 51' has supported thereon a jig assembly 63 adapted to handle a tentative engine compartment assembly E and front and rear floor assemblies Ff and Fr for an automotive vehicle of, for example, the previously mentioned model "B" and is positioned below the upstream branch portions 10 and 10' of the shuttle bar 9 when such assemblies E, Ff and Fr are to be welded together into a tentative vehicle floor structure S. In the arrangement of FIG. 9, such a jig assembly 63 is shown comprising a support frame 64 fixedly mounted on the upper face of the carrier block 53', and a set of jigs or fixtures 65 for supporting engine compartment and front and rear floor assemblies E, Ff and Fr for an automotive vehicle of the model "B". The support frame 64 has further supported thereon a series of backing electrodes 66 to be used for the spot welding of the above mentioned assemblies E, Ff and Fr together as will also be described in more detail. The carrier blocks 53 and 53' are selectively moved into an operative position below the upstream branch portions 10 and 10' of the shuttle bar 9 as will be described in detail.

The previously mentioned cross beams 50 and 50' have fixedly mounted thereon bracket members 67 and 67', respectively. The bracket members 67 on one cross beam 50 have securely attached thereto a lateral guide beam 68 longitudinally extending in parallel with the guide rail 51 and, likewise, the bracket members 67' on the other cross beam 50' has securely attached thereto a lateral guide beam 68 longitudinally extending in parallel with the guide rail 51'. Each of the above described first and second carrier blocks 53 and 53' has a lateral front end member having a sliding guide strip 69 securely fitted therein and a lateral rear end member having a sliding guide strip 69' securely fitted therein as illustrated in FIG. 8. The sliding guide strips 69 and 69' thus fitted to the front and rear ends of each of the carrier blocks 53 and 53' are held in slidable contact with the laterally inner faces of the lateral guide beams 68 and 68', respectively, so that each of the carrier blocks 53 and 53' is restrained from being moved in a fore-and-aft direction of the apparatus.

As shown in FIG. 9, the first and second carrier blocks 53 and 53' have bracket members 70 and 70', respectively, securely attached to their laterally inner end members. The bracket members 70 and 70' are formed with downwardly open vertical bores 71 and 71', respectively. A coupling block 72 intervenes between the first and second carrier blocks 53 and 53' and has two projections or pins 73 and 73' upstanding from the upper face of the coupling block 72 and spaced apart in parallel from each other in a lateral direction of the apparatus. The pins 73 and 73' thus secured to the coupling block 72 project upwardly into the vertical bores 71 and 71' in the above mentioned bracket members 70 and 70', respectively, so that the first and second carrier blocks 53 and 53' are coupled together by the bracket members 70 and 70' and the pins 73 and 73' and are thus movable together on and along the guide rails 51 and 51'. As illustrated in part in FIG. 8, the bracket members 74 and 74' project downwardly from front and rear end portions, respectively, of the coupling block 72 and are securely connected to lateral toothed rack members 75 and 75', respectively, extending in parallel with the guide rails 51 and 51' and each formed with teeth on its lower face. One toothed rack member 75 longitudinally extends between and in parallel with the cross beam 50 and the associated guide rail 51 and, likewise, the other toothed rack member 75' longitudinally extends between and in parallel with the cross beam 50' and the associated guide rail 51'. The cross beam 50 has carried thereon a series of upper guide rollers 76 which are held in rollable engagement with the upper face of the toothed rack member 75 and a series of lower guide rollers 77 which are held in rollable engagement with the lower face of the toothed rack member 75. Furthermore, the guide rail 51 has carried thereon a series of upper guide rollers 78 which are held in rollable engagement with the upper face of the toothed rack member 75 and a series of lower guide rollers 79 which are held in rollable engagement with the lower face of the toothed rack member 75. Similarly, the cross beam 50' has carried thereon a series of upper guide rollers 76' which are held in rollable engagement with the upper face of the toothed rack member 75' and a series of lower guide rollers 77' which are held in rollable engagement with the lower face of the toothed rack member 75'. Furthermore, the guide rail 51' has carried thereon a series of upper guide rollers 78' which are held in rollable engagement with the upper face of the toothed rack member 75' and a series of lower guide rollers 79' which are held in rollable engagement with the lower face of the toothed rack member 75'. Thus, the toothed rack member 75 is movable back and forth in a lateral direction of the apparatus between the series of upper guide rollers 76 and the series of lower guide rollers 77 on the cross beam 50 and between the series of upper guide rollers 78 and the series of lower guide rollers 79 on the guide rail 51. Likewise, the toothed rack member 75' is movable back and forth in a lateral direction of the apparatus between the series of upper guide rollers 76' and the series of lower guide rollers 77' on the cross beam 50' and between the series of upper guide rollers 78' and the series of lower guide rollers 79' on the guide rail 51'. The coupling block 72 connected to the toothed rack members 75 and 75' is thus movable back and forth along the guide rails 51 and 51' in a lateral direction of the apparatus.

As will be best seen from FIG. 9, the lower base frame 44 has fixedly supported mounted on its portion adjacent the supporting block 48 a reversible electric motor 80 which is mounted on the upper face of the base frame 44 in such a manner as to have its output shaft 81 oriented in a lateral direction of the apparatus. The output shaft 81 of the motor 80 is securely connected through a coupling 82 to the input shaft 83 of a reduction gear unit 84 which is also mounted on the upper face of the lower base frame 44. The reduction gear unit 84 in turn has its output shaft 85 having a center axis in a fore-and-aft direction of the apparatus and journaled in a suitable bearing member (not shown) fixedly mounted on the upper face of the lower base frame 44. The output shaft 85 of the reduction gear unit 84 has securely and coaxially carried thereon a pair of pinion gears 86 and 86' which are held in mesh with the toothed rack members 75 and 75', respectively. When the motor 80 is in operation driving the output shaft 85 of the reduction gear unit 84 for rotation in either direction about the center axis thereof through the coupling 82, the pinion gears 86 and 86' thus drive the toothed rack members 75 and 75', respectively, to longitudinally move rightwardly or leftwardly in lateral directions of the apparatus. The first and second carrier blocks 53 and 53' coupled together by means of the coupling block 72 are thus movable between predetermined outermost lateral positions, respectively, close to the opposite ends of the guide rails 51 and 51'. The supporting blocks 48 and 48' have first and second damper units 87 and 87' (FIG. 7) which are located to be engageable with the laterally outer end members of the first and second carrier blocks 53 and 53', respectively, when the carrier blocks 53 and 53' are moved into the respective outermost lateral positions thereof. When one of the first and second carrier blocks 53 and 53' is held in the outermost lateral position thereof, the other of the carrier blocks 53 and 53' assumes the previously mentioned operative position below the upstream branch portions 10 and 10' of the shuttle bar 9.

The lower working station 52 of the multi-spot welding machine 24 further comprises a horizontal platform 88 positioned below the upstream branch portions 10 and 10' of the shuttle bar 9 across one of the first and second carrier blocks 53 and 53' depending upon the lateral positions of the carrier blocks 53 and 53' with respect to the shuttle bar 9. The lower working station 52 further comprises a pair of fluid-operated balancing power cylinders 90 and 90' having their respective cylinder bodies securely mounted on the lower base frame 44. The balancing power cylinders 90 and 90' have piston rods 91 and 91', respectively, axially extending upwardly from the cylinder bodies and securely connected at the upper ends thereof to opposite longitudinal end portions, respectively, of the lifting platform 88. The lower base frame 44 has further supported thereon a fluid-operated drive power cylinder 92 having its cylinder body securely mounted on the base frame 44 and a piston rod 93 axially extending upwardly from the cylinder body and securely connected at the upper end thereof to a middle portion of the lifting platform 88. The lifting platform 88 is thus movable upwardly and downwardly with respect to the lower base frame 44 and accordingly to the upstream branch portions 10 and 10' of the shuttle bar 9 as the piston rod 93 of the drive power cylinder 92 is caused to axially protrude upwardly or retracted downwardly. The balancing power cylinders 90 and 90' are adapted to maintain the lifting platform 88 in a correct horizontal position with respect to the piston rod 93 of the drive power cylinder 92. The lifting platform 88 has mounted on its upper wall member a pair of upward protrusions 94 and 94' which are located adjacent the front and rear ends, respectively, of the lifting platform 88 as illustrated in FIG. 8. On the other hand, the first carrier block 53 has formed in its lower wall member a pair of slots 95 and 95' which are located adjacent the front and rear ends, respectively, of the carrier block 53 as also shown in FIG. 8. When the first carrier block 53 is held in the previously mentioned operative position below the upstream branch portions 10 and 10' of the shuttle bar 9, the slots 95 and 95' thus formed in the lower wall member of the first carrier block 53 are vertically aligned with the protrusions 94 and 94', respectively, of the lifting platform 88. Though not shown in the drawings, the second carrier block 53' has formed in its lower wall member a pair of slots and which are located adjacent the front and rear ends, respectively, of the carrier block 53'. When the second carrier block 53' is held in the operative position below the upstream branch portions 10 and 10' of the shuttle bar 9, the slots thus formed in the lower wall member of the second carrier block 53' are vertically aligned with the protrusions 94 and 94', respectively, of the lifting platform 88.

Figure 10:
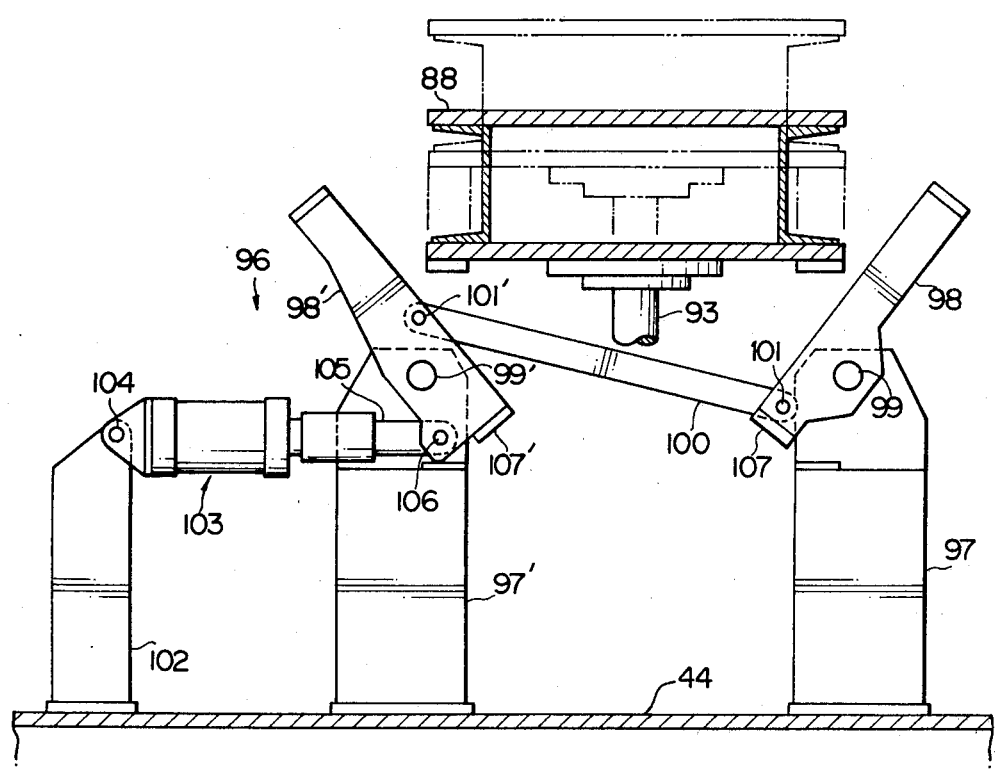
FIG. 10 is a rear elevation view showing, partly in cross section, a stop mechanism forming part of the lower working station of the multi-spot welding machine illustrated in FIGS. 8 and 9.

Between the front balancing power cylinder 90 and the drive power cylinder 92 and between the rear balancing power cylinder 90' and the drive power cylinder 92 are positioned front and rear stop mechanisms 96 and 96', respectively, which are adapted to limit the lowermost position of the above described lifting platform 88 above and with respect to the lower base frame 44. The two stop mechanisms 96 and 96' are similar in construction and arrangement to each other and, thus, the detailed construction of the front stop mechanism 96 alone will be herein described is shown in FIG. 10 of the drawings. Referring to FIG. 10, the stop mechanism 96 comprises a pair of vertical main bracket structures 97 and 97' upstanding from the upper face of the lower base frame 44 and spaced apart from each other in a lateral direction of the apparatus. The bracket structure 97 has a rockable arm 98 pivotally mounted on an upper end portion of the bracket structure 97 by a pivot pin 99 and, likewise, the bracket structure 97' has a rockable arm 98' pivotally mounted on an upper end portion of the bracket structure 97' by a pivot pin 99'. The pivot pins 99 and 99' axially extend in fore-and-aft directions of the apparatus so that the rockable arms 98 and 98' are rockable laterally of the apparatus. Each of the rockable arms 98 and 98' has a flat lower face for a reason to be explained later. A connecting rod 100 is pivotally connected at one end thereof to a lower end portion of one of the rockable arms such as the rockable arm 98 by a pivot pin 101 as shown and at the other end thereof to an intermediate portion of the other rockable arm 98' by a pivot pin 101'. The connecting rod 100 thus forms part of a link mechanism enabling the two rockable arms 98 and 98' to concurrently turn about the pivot pins 99 and 99', respectively. The stop mechanism 96 further comprises an auxiliary vertical bracket structure 102 also upstanding from the upper face of the lower base frame 44 in parallel with the main bracket structures 97 and 97' and located outwardly of the bracket structure 97' in a lateral direction of the apparatus. The auxiliary bracket structure 102 has supported thereon a fluid-operated power cylinder 103 having a cylinder body pivotally connected to an upper end portion of the bracket structure 102 by a pivot pin 104 parallel with the pivot pin 99' on the bracket structure 97' and a piston rod 105 pivotally connected at its leading end to a lower end portion of the rockable arm 98' by a pivot pin 106 which is also parallel with the pivot pin 99' on the bracket structure 97'. The rockable arms 98 and 98' are thus caused to concurrently turn about the pivot pins 99 and 99', respectively, toward or away from each other when the piston rod 105 of the power cylinder 103 is actuated to axially project from or is retracted into the cylinder body of the cylinder 103. The main bracket structures 97 and 97' have stay members 107 and 107', respectively, each having a flat upper face. These stay members 107 and 107' are arranged so that, when the rockable arms 98 and 98' assume upright positions, the rockable arms 98 and 98' have their respective flat lower faces closely held in contact with the flat upper faces of the stay members 107 and 107', respectively, and are held in the upright positions on the bracket structures 97 and 97', respectively. When the rockable arms 98 and 98' are thus held in the upright positions, the previously described lifting platform 88 is enabled to rest on the flat upper faces of the rockable arms 98 and 98' as indicated by dots-and-dash lines in FIG. 10 and is thereby maintained in a predetermined lowermost limit position thereof with respect to the shuttle bar 9 (FIG. 7).

As shown in FIGS. 6 and 7, the multi-spot welding machine 24 provided in the primary assembling stage 4 (FIG. 1) further comprises an upper working station 108 provided above the horizontal plane on which the shuttle bar 9 longitudinally extends. The upper working station 108 comprises a pair of upper lateral support beams 109 and 109' secured to the upper base frame 47. The upper lateral support beams 109 and 109' longitudinally extend in lateral directions of the apparatus and are horizontally spaced apart in parallel from each other in a fore-and-aft direction of the apparatus. The support beams 109 and 109' have a series of rollers 110 carried on the inner face of the support beam 109 and a series of rollers 110' carried on the inner face of the support beam 109', the rollers 110 and 110' having respective axes of rotation on a common horizontal plane. As will be seen more clearly from FIG. 11 of the drawings, the rollers 110 and 110' have supported thereon first and second carrier bases 111 and 111'. As shown in FIG. 6, each of the first and second carrier bases 111 and 111' has a pair of parallel ledge portions 112 and 112' longitudinally extending in lateral directions of the apparatus and respectively resting on the series of rollers 110 and 110' on the support beams 109 and 109' so that the carrier bases 111 and 111' are movable in parallel with the support beams 109 and 109' and accordingly with the upstream branch portions 10 and 10' of the shuttle bar 9. As shown in FIG. 7, the carrier bases 111 and 111' have first and second welding units 113 and 113' downwardly depending from the carrier bases 111 and 111', respectively. The first welding unit 113 comprises a plurality of gun-type spot welding heads 114 and, likewise, the second welding unit 113' comprises a plurality of gun-type welding heads 114'. The welding heads 114 of the first welding unit 113 are adapted to handle the tentative engine compartment assembly E, front floor assembly Ff and rear floor assembly Fr to form a vehicle floor structure S for an automotive vehicle of, for example, the previously mentioned model "A" while the welding heads 114' of the second welding unit 113' are adapted to handle the tentative engine compartment assembly E, front floor assembly Ff and rear floor assembly Fr to form a vehicle floor structure S for an automotive vehicle of, for example, the previously mentioned model "B". Thus, the first welding unit 113 is moved into a predetermined operative lateral position above the upstream branch portions 10 and 10' of the shuttle bar 9 when the tentative assemblies E, Ff and Fr to form the vehicle floor structure S of an automotive vehicle of the model "A" are conveyed into the assembling stage 5a and, likewise, the second welding unit 113' is moved into a predetermined operative lateral position above the upstream branch portions 10 and 10' of the shuttle bar 9 when the tentative assemblies E, Ff and Fr to form the vehicle floor structure S of an automotive vehicle of the model "B" are conveyed into the assembly stage 5a. When one of the welding units 113 and 113' is thus moved into the above mentioned operative lateral position thereof, the other of the welding units 113 and 113' is moved into a predetermined outermost lateral position with respect to the shuttle bar 9 as will be seen from FIGS. 7 and 11 in which the first and second welding units 113 and 113' are shown held in the operative and outermost lateral positions, respectively, thereof.

The first and second carrier bases 111 and 111' have bracket members 115 and 115', respectively, securely attached to their laterally inner end members. The bracket members 115 and 115' are formed with downwardly open vertical bores 116 and 116', respectively. A coupling block 117 intervenes between the first and second carrier bases 111 and 111' and has two pins 118 and 118' upstanding from the upper face of the coupling block 117 and spaced apart in parallel from each other in a lateral direction of the apparatus. The pins 118 and 118' secured to the coupling block 117 project upwardly into the vertical bores 116 and 116' in the above mentioned bracket members 115 and 115' respectively, so that the first and second carrier bases 111 and 111' are coupled together by the bracket members 115 and 115' and the pins 118 and 118' and are thus movable together on and along the support beams 109 and 109'

One of the upper lateral support beams such as the support beam 109' has securely connected thereto a pair of shafts 119 and 119' which axially extend in fore-and-aft directions of the apparatus and which are horizontally spaced apart from each other in a lateral direction of the apparatus. The shafts 119 and 119' have rotatably mounted thereon sprocket wheels 120 and 120', respectively, having a chain 121 of link or roller elements passed therebetween as indicated by phantom lines in FIG. 11. The chain 121 is anchored at the opposite ends thereof to the above described coupling block 117 by means of a connecting element 122 so that the coupling block 117 is movable with the chain 121 along the support beam 109'. A reversible electric motor 123 is fixedly supported on the upper base frame 47 and has an output shaft 124 axially extending in a lateral direction of the apparatus. The output shaft 124 of the motor 123 is connected through a coupling 125 to the input shaft 126 of a reduction gear unit 127 which is also fixedly supported on the upper base frame 47 and which has an output shaft 128 axially extending in a fore-and-aft direction of the apparatus. The output shaft 128 of the reduction gear unit 127 has fixedly carried thereon a sprocket wheel 129 which cooperates with a sprocket wheel 130 fixedly mounted on the shaft 119 on the support beam 109 in coaxial relationship to the sprocket wheel 120 on the shaft 119. An endless chain 131 of link or roller elements is passed between the sprocket wheels 129 and 130 so that a drive line is provided from the output shaft 128 of the reduction gear unit 127 to the coupling block 117 through the sprocket wheel 129, endless chain 131, sprocket wheel 130, sprocket wheel 120, and chain 121. When the motor 123 is in operation driving the output shaft 128 of the reduction gear unit 127 for rotation in either direction about the axis thereof, the coupling block 117 is thus driven to travel in either direction along the upper lateral support beams 109 and 109'. The upper lateral support beams 109 and 109' have securely attached thereto first and second damper units 132 and 132' provided at the opposite lateral ends of the beams 109 and 109' so that the first and second carrier bases 111 and 111' are brought into engagement with the first and second damper units 132 and 132', respectively, when the first and second welding units 113 and 113' are moved into the respective outermost lateral positions thereof.

The first and second carrier bases 111 and 111' are formed with vertical bores 133 and 133', respectively, which are open upwardly as indicated by broken lines in FIG. 11. On the other hand, the upper base frame 47 has fixedly mounted thereon a bracket member 134 having supported thereon a fluid-operated locking power cylinder 135. The power cylinder 135 has a cylinder body securely mounted on the bracket member 134 and a piston rod 136 axially projecting downwardly from the cylinder body. The piston rod 136 is securely connected at its lower end to a locking rod 137 which movably extends downwardly through an opening formed in the base frame 47. The locking rod 137 projects downwardly from the bottom of the base frame 47 when the piston rod 136 of the power cylinder 135 is axially extended downwardly. When each of the first and second welding units 113 and 113' is held in the previously mentioned operative lateral position thereof above the upstream branch portions 10 and 10' of the shuttle bar 9, the vertical bore 133 or 133' in the first and second carrier bases 111 and 111' is located vertically in alignment with the locking rod 137 thus projecting downwardly from the bottom of the base frame 47 so that the locking rod 137 is capable of projecting into the bore 133 or 133' and thereby locking the first or second welding unit 113 or 113' in the predetermined operative lateral position thereof with respect to the shuttle bar 9.

Vertically between the lower and upper working stations 52 and 108 constructed and arranged as hereinbefore described is provided stop means 138 adapted to define the uppermost limit position of each of the first and second carrier blocks 53 and 53' of the lower working station 52. As schematically shown in FIGS. 6 and 7, the stop means 138 comprises a pair of front support beams 139 and a pair of rear support beams 139' longitudinally extending in fore-and-aft directions of the apparatus, viz., in parallel with the upstream branch portions 10 and 10' of the shuttle bar 9. The front support beams 139 are horizontally spaced apart in parallel from each other in a lateral direction of the apparatus and rearwardly extend from vertically intermediate portions of the front vertical posts 45, respectively. Likewise, the rear support beams 139' are horizontally spaced apart in parallel from each other in a lateral direction of the apparatus and forwardly extend from vertically intermediate portions of the rear vertical posts 46, respectively, toward the front support beams 139. The front and rear support beams 139 and 139' thus arranged have securely supported thereon bracket members 140 and 140', respectively, each projecting downwardly and inwardly in a lateral direction of the apparatus as will be seen from FIGS. 6 and 7. The bracket members 140 and 140' in turn have abutment or locking units 141 and 141', respectively, supported therefrom. The individual abutment units 141 and 141' are constructed and arranged similarly to each other and, for this reason, the construction and arrangement of one of the locking units 141 carried by the bracket members 140 of the front support beams 139 will be herein described with reference to FIG. 12 of the drawings.

Referring to FIG. 12, the locking unit 141 comprises a rockable arm 142 having an intermediate portion pivotally connected to the bracket member 140 by a pivot pin 143 extending in a fore-and-aft direction of the apparatus. A fluid-operated power cylinder 144 has a cylinder body securely connected to the support beam 139 and a piston rod 145 axially extending from the cylinder body in a lateral direction of the apparatus. The piston rod 145 is pivotally connected at its leading end to one end portion of the rockable arm 142 by a pivot pin 146 parallel with the above mentioned pivot pin 143 on the bracket member 140. The rockable arm 142 further has a roller 147 rotatably mounted on another end portion of the rockable arm 142. On the other hand, each of the first and second carrier blocks 53 and 53' has two pairs of lug members 148 which are securely attached to opposite side end portions of the carrier block and which are engageable with the rollers 147 forming part of the individual locking units 141 and 141' when the power cylinders 144 of the locking unit are held in conditions having the piston rods 145 axially retracted as shown in FIG. 12.

Figure 3:
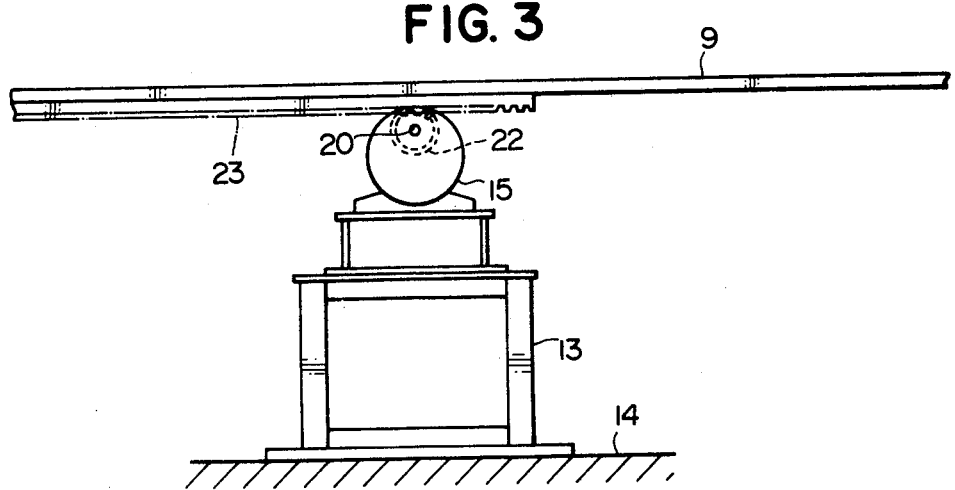
FIG. 3 is a side elevation view of the drive means shown in FIG. 2.
Figure 4:
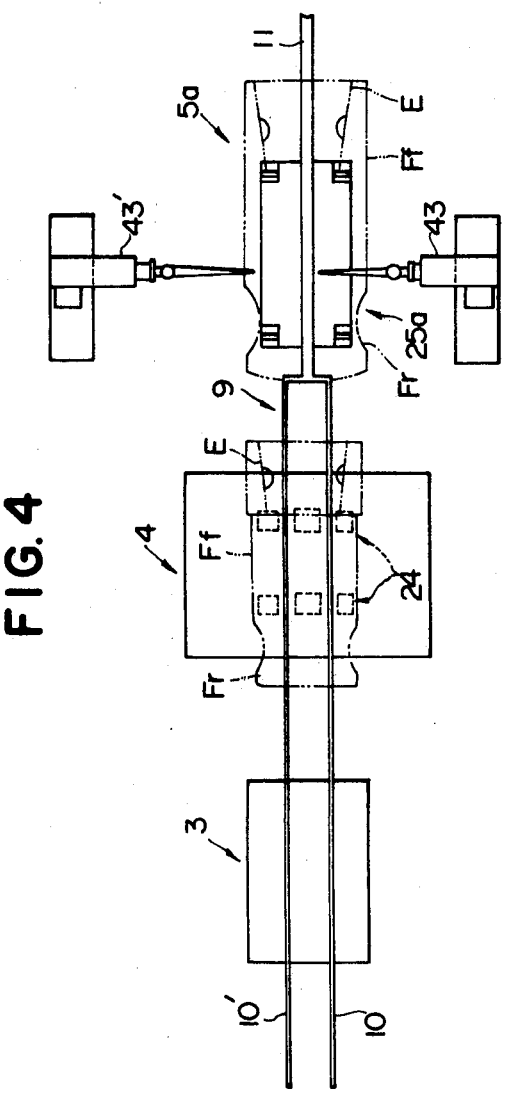
FIG. 4 is a plan view showing, to an enlarged scale, a portion of the assembling apparatus illustrated in FIG. 1.

Description will be hereinafter made with concurrent reference to FIGS. 1 to 12 regarding the operation of the multi-spot welding machine 24 thus constructed and arranged in the primary assembling stage 4 (FIG. 4). In the description to follow, it will be assumed, by way of example, that the tentative engine compartment assembly E, front floor assembly Ff and rear floor assembly Fr forming the tentative vehicle floor structure S are to be spot welded together at locations at which the tentative vehicle floor structure S forms a tunnel portion T (FIG. 7). The jig assemblies 56 and 63, particularly, the jigs or fixtures 65 and the backing electrodes 59 of the jig assembly 56 and the jigs or fixtures 65 and the backing electrodes 66 of the jig assembly 63 forming part of the lower working station 52 (FIGS. 8 and 9) and the welding heads 114 and 114' of the welding units 113 and 113', respectively, forming part of the upper working station 108 are arranged particularly in such a manner as to be suitable for welding the tentative assemblies E, Ff and Fr at such locations. In the following description, furthermore, it will be assumed for simplicity of discussion that only one vehicle floor structure S is to be formed in the main and subsidiary assembly lines 1, 7 and 7' although actually a number of vehicle floor structures are to be assembled concurrently and successively in the lines 1, 7 and 7'.

At the first initial assembling stage 2a (FIG. 1), a plurality of component members to constitute an engine compartment assembly of a vehicle body structure are provisionally spot welded together so as to form a tentative engine compartment assembly E by means of the multi-spot welding machine 6a. Concurrently, a plurality of component members to constitute a front floor assembly and a plurality of component members to constitute a rear floor assembly of a vehicle body structure are provisionally spot welded together to form a tentative front floor assembly Ff and a tentative rear floor assembly Fr by means of the multi-spot welding machines 6b and 6c in the stages 2b and 2c, respectively. The tentative engine compartment assembly E formed at the first initial assembling stage 2a is conveyed on the upstream branch portions 10 and 10' of the shuttle bar 9 to the positioning stage 3 and the tentative front and rear floor assemblies Ff and Fr formed at the second and third initial assembling stages 2b and 2c, respectively, are conveyed through the subsidiary assembly lines 7 and 7' to the positioning stage 3 by suitable conveyor means (not shown). The front floor assembly Ff conveyed to the positioning stage 3 is passed on to the jig 34 (FIG. 5) and is thus held in a predetermined position in the stage 3 and, thereupon, the engine compartment assembly E and rear floor assembly Fr are conveyed to the positioning stage 3 and are passed on to the jigs 33 and 35 (FIG. 5), respectively, so as to be held in correct predetermined positions with respect to the front floor assembly Ff. In this instance, the engine compartment assembly E, front floor assembly Ff and rear floor assembly Fr are positioned with respect to one another in such a manner that the front floor assembly Ff has front and rear end portions respectively overlapped by a rear end portion of the engine compartment assembly E and a front end portion of rear floor assembly Fr as previously noted. Immediately after the tentative assemblies E, Ff and Fr are thus passed on to the jigs 33, 34 and 35, respectively, in the positioning stage 3, the above mentioned conveyor means is caused to move back to the second and third initial assembling stages 2b and 2c, respectively, for subsequent operation. The drive power cylinder 31 (FIG. 5) in the positioning stage 3 is now actuated to cause its piston rod 32 to be retracted downwardly, causing the jigs 33, 34 and 35 to lower until the tentative engine compartment assembly E, front floor assembly Ff and rear floor assembly Fr respectively carried thereon are received on the upstream branch portions 10 and 10' of the shuttle bar 9. By the time the tentative assemblies E, Ff and Fr are thus transferred to the upstream branch portions 10 and 10' of the shuttle bar 9, the shuttle bar 9 is held in a predetermined rearmost longitudinal position in the main assembly line 1.

Figure 2:
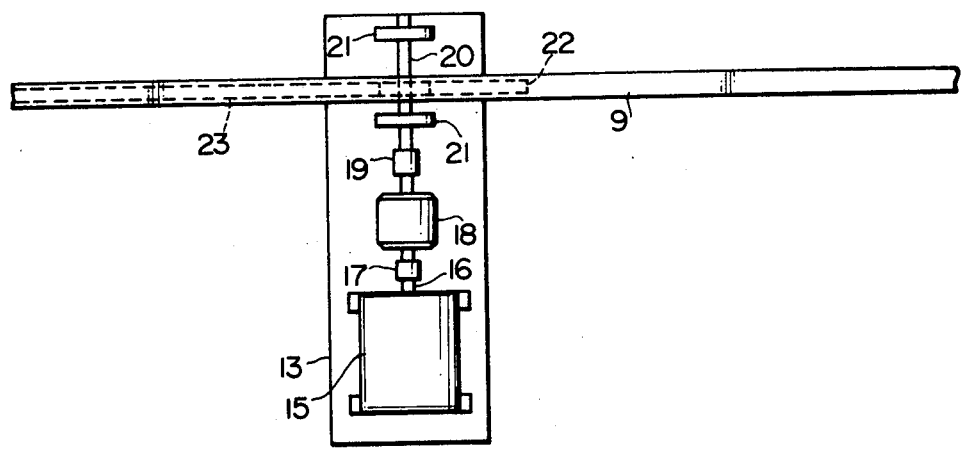
FIG. 2 is a plan view showing the construction and arrangement of drive means for a shuttle bar included in the embodiment illustrated in FIG. 1.

Now that the tentative engine compartment assembly E, front floor assembly Ff and rear floor assembly Fr are thus transferred to the upstream branch portions 10 and 10' of the shuttle bar 9, the motor 15 of the drive means 12 illustrated in FIGS. 2 and 3 is put into operation driving the drive shaft 20 for rotation in one direction about the axis thereof through the coupling 17, reduction gear unit 18 and coupling 19, causing the pinion gear 22 to drive the toothed rack member 23 and accordingly the shuttle bar 9 to move forwardly of the apparatus. The shuttle bar 9 being thus moved forwardly from the above mentioned predetermined rearmost position thereof, the tentative engine compartment assembly E, front floor assembly Ff and rear floor assembly Fr held in correct predetermined positions with respect to one another on the upstream branch portions 10 and 10' of the shuttle bar 9 are conveyed from the positioning stage 3 to the primary assembling stage 4 (FIG. 1).

When the tentative engine compartment assembly E, front floor assembly Ff and rear floor assembly Fr on upstream branch portions 10 and 10' of the shuttle bar 9 reach positions vertically intervening between the respective operative positions of one of the first and second carrier blocks 53 and 53' (FIGS. 7 and 9) of the lower working station 52 and one of the first and second welding units 113 and 113' (FIG. 11), the motor 15 (FIGS. 2 and 3) is brought to a stop so that the shuttle bar 9 is caused to cease its forward movement and is held at rest in a predetermined foremost longitudinal position thereof. In this instance, it is assumed for convenience sake that the first carrier block 53 of the lower working station 52 and the first welding unit 113 of the upper working station 108 are held in their respective operative positions below and above the upstream branch portions 10 and 10' of the shuttle bar 9 as shown in FIGS. 6 to 11. Furthermore, the drive power cylinder 92 (FIGS. 6 to 9) of the lower working station 52 has its piston rod 93 held in an axial position slightly protruding upwardly from the cylinder body so that the upward protrusions 94 and 94' on the upper wall member of the lifting platform 88 are received in the slots 95 and 95', respectively, in the lower wall member of the first carrier block 53. The carrier block 53 is therefore carried on the lifting platform 88 and is thus held in a vertical position slightly raised from the horizontal plane on which the second carrier block 53' is positioned. As a consequence, the bracket member 70 secured to the first carrier block 53 is located above the pin 73 on the coupling block 72 with the result that the pin 73 is disengaged from the bracket member 70. On the other hand, the power cylinder 103 (FIG. 10) forming part of each of the stop mechanisms 96 and 96' (FIG. 8) is held in a condition having the piston rod 105 axially retracted into the cylinder body so that the rockable arm 98' and accordingly the rockable arm 98 are maintained in the respective upright positions thereof as indicated by dots-and-dash lines in FIG. 10. Thus, the rockable arms 98 and 98' have their respective flat lower faces closely received on the flat upper faces of the stay members 107 and 107' and their flat upper end faces held in bearing engagement with the lower face of the lifting platform 88 as also indicated by dots-and-dash lines in FIG. 10. In these manners, the weights of the first carrier block 53 and the jig assembly 56 are borne partially by the piston rod 93 of the drive power cylinder 92 (FIGS. 8 and 9) and partially by the bracket structures 97 and 97' (FIG. 10) of each of the stop mechanisms 96 and 96' through the rockable arms 98 and 98' of each stop mechanism and, furthermore, the first carrier block 53 is constrained from being moved downwardly toward the guide rails 51 and 51'.

The drive power cylinder 92 of the lower working station 52 is now actuated to cause the piston rod 93 to axially protrude upwardly, causing the lifting platform 88 to move upwardly from the flat upper faces of the rockable arms 98 and 98' (FIG. 10) of each of the stop mechanisms 96 and 96' (FIGS. 6 and 8) and to lift the carrier block 53 and the jig assembly 56 over the guide rails 51 and 51'. When the jig assembly 56 on the carrier block 53 reaches a vertical position capable of receiving the tentative engine compartment assembly E, front floor assembly Ff and rear floor assembly Fr on the upstream branch portions 10 and 10' of the shuttle bar 9, the assemblies E, Ff and Fr are transferred from the shuttle bar 9 to the jig assembly 56. With the engine compartment and front and rear floor assemblies E, Ff and Fr thus carried on the jig assembly 56, the carrier block 53 is raised to the predetermined operative position immediately below the upstream branch portions 10 and 10' of the shuttle bar 9 as indicated by dots-and-dash lines in FIG. 7 by the drive power cylinder 92 which has its piston rod 93 axially extending to the uppermost limit position thereof. In the meantime, the power cylinder 144 of each of the locking units 141 and 141' is actuated to cause the piston rod 145 to be axially retracted into the cylinder body, causing the rockable arm 142 to turn about the pivot pin 143 in a direction to have the roller 147 brought into engagement with each of the lug members 148 on the carrier block 53. The carrier block 53 is thus locked in the uppermost predetermined operative position thereof with respect to the shuttle bar 9.

In the upper working station 108, the first welding unit 113 is assumed to be held in the predetermined operative lateral position thereof immediately above the upstream branch portions 10 and 10' of the shuttle bar 9 as shown in FIGS. 6 and 11. Thus, the first carrier base 111 having the first welding unit 113 connected thereto is held in a lateral position having the vertical bore 133 vertically aligned with the locking rod 137 of the stop means 138. The power cylinder 135 of the stop means 138 is maintained in a condition having the piston rod 136 axially extended downwardly so that the locking rod 137 connected to the piston rod 136 has its lower end portion inserted into the vertical bore 133 in the first carrier base 111, which is thus locked in the predetermined operative lateral position with respect to the shuttle bar 9. When the first carrier block 53 of the lower working station 52 is locked in the predetermined operative position thereof as above described, the welding heads 114 of the first welding unit 113 are thus actuated so that the tentative engine compartment assembly E, front floor assembly Ff and rear floor assembly Fr carried on the carrier block 53 are provisionally or tack welded together between the set of welding heads 114 of and the sets of backing electrodes 59 on the carrier block 53, thereby forming a tentative vehicle floor structure S. In this instance, the tentative vehicle floor structure S has the tentative engine compartment and front and rear floor assemblies E, Ff and Fr spot welded together at locations on the tunnel portion T of the vehicle floor structure S as will be best seen from FIG. 7. While the tentative engine compartment and front and rear floor assemblies E, Ff and Fr are being moved upwardly toward the welding unit 113 and thereafter spot welded, the upstream branch portions 10 and 10' of the shuttle bar 9 are located on both sides of and spaced apart from the backing electrodes 59 on the carrier block 53 as will also be seen from FIG. 7 so that the backing electrodes 59 are not obstructed by the upstream branch portions 10 and 10' of the shuttle bar 9 not only during the welding operation but when the carrier block 53 is being moved upwardly toward the welding unit 113. During the period of time when the tentative engine compartment and front and rear floor assemblies E, Ff and Fr are being thus welded together in the primary assembling stage 4, the reversible motor 15 forming part of the drive means 12 (FIGS. 2 and 3) is actuated to drive the drive shaft 20 for rotation in a reverse direction about the axis thereof for a predetermined period of time so that the shuttle bar 9 is caused to return to the initial rearmost longitudinal position thereof. When the shuttle bar 9 is held in the rearmost longitudinal position thereof, the single straight downstream portion 11 of the shuttle bar 9 extends forwardly from between the primary assembling stage 4 and the first secondary assembling stage 5a of the main assembly line 1, as shown in FIG. 1.

Now that the engine compartment assembly E, front floor assembly Ff and rear floor assembly Fr are thus provisionally spot welded together to form the tentative vehicle floor structure S, the spot welding heads 114 of the first welding unit 113 are caused to withdraw upwardly from the tunnel portion T of the vehicle floor structure S and, at the same time, the power cylinder 144 of each of the locking units 141 and 141' (FIG. 12) is operated to cause the piston rod 145 to axially extend from the cylinder head, causing the rockable arm 142 to turn about the pivot pin 143 in a direction to bring the roller 147 out of engagement with each of the lug members 148 on the carrier block 53. On the other hand, the drive power cylinder 92 (FIGS. 6 to 9) of the lower working station 52 is operated to cause its piston rod 93 to be axially retracted downwardly into the cylinder body and thereby causes the lifting platform 88 to move downwardly until the lifting platform 88 has its bottom face received for a second time on the flat upper faces of the rockable arms 98 and 98' (FIG. 10) of each of the stop mechanisms 96 and 96' (FIG. 6 and 8). While the lifting platform 88 is being thus moved downwardly, the carrier block 53 received on the lifting platform 88 is also moved downwardly from the predetermined operative position thereof below the upstream branch portions 10 and 10' of the shuttle bar 9 so that the tentative vehicle floor structure S carried on the carrier block 53 is transferred from the carrier block 53 to the upstream branch portions 10 and 10' of the shuttle bar 9. Under these conditions, the upstream branch portions 10 and 10' of the shuttle bar 9 have carried thereon not only the tentative vehicle floor structure S thus transferred from the carrier block 53 but a combination of a tentative engine compartment assembly E, tentative front floor assembly Ff and tentative rear floor assembly Fr newly transferred from the jig assembly 8 of the positioning stage 3 (FIG. 1).

The motor 15 of the drive means 12 (FIGS. 2 and 3) for the shuttle bar 9 is then actuated to drive the shuttle bar 9 to move forwardly from the predetermined rearmost longitudinal position to the predetermined foremost longitudinal position thereof. The tentative vehicle floor structure S carried on the upstream branch portions 10 and 10' of the shuttle bar 9 is therefore delivered from the primary assembling stage 4 to the first secondary assembling stage 5a (FIGS. 1, 4 and 5). In the first secondary assembling stage 5a, the drive power cylinder 40 is now actuated to cause its piston rod 41 to axially extend upwardly and causes the support members 42 and 42' on the lifting platform 39 to receive the tentative vehicle floor structure S from the shuttle bar 9 and lift the structure S into a predetermined position ready to be welded by the welding heads 43 and 43' of the welding robots 25a in the first secondary assembling stage 5a. The component assemblies E, Ff and Fr constituting the tentative vehicle floor structure S and the component members constituting each of the assemblies E, Ff and Fr are thus further welded together by the welding heads 43 and 43'. Immediately after the tentative vehicle floor structure S is transferred from the upstream branch portions 10 and 10' of the shuttle bar 9 to the support members 42 and 42' of the lifting platform 39, the motor 15 of the drive means 12 (FIGS. 2 and 3) for the shuttle bar 9 is actuated to drive the drive shaft 20 in a reverse direction about the axis thereof so that the shuttle bar 9 is for a second time returned to the predetermined rearmost longitudinal position thereof. When the welding heads 43 and 43' in the first secondary assembling stage 5a are actuated, the single straight downstream portion 11 of the shuttle bar 9 extends between the welding heads 43 and 43' as will be best seen from FIG. 4 so that the welding heads 43 and 43' are not obstructed by the shuttle bar 9 during welding operation. Upon completion of the welding operation in the first secondary assembling stage 5a, the tentative vehicle floor structure S is transferred from the first secondary assembling stage 5a to the single straight downstream portion 11 of the shuttle bar 9 and from the shuttle bar 9 to the secondary assembling stage 5b. The tentative component assemblies constituting the tentative vehicle floor structure S and the component members constituting each of the tentative assemblies E, Ff and Fr are thus additionally welded together successively by means of the welding robots 25b, 25c and 25d in the second, third and fourth secondary assembling stages 5b, 5c and 5d, respectively. The vehicle floor structure S composed of the engine compartment and front and rear floor assemblies E, Ff and Fr is in these manners made complete in the fourth secondary assembling stage 5d of the main assembling line 1.

If, now, the tentative engine compartment assembly E, front floor assembly Ff and rear floor assembly Fr newly transferred from the positioning stage 3 to the primary assembling stage 4 are those to constitute a vehicle floor structure S for an automotive vehicle of the previously mentioned model "B", the multi-spot welding machine 24 provided in the primary assembling stage 4 is re-conditioned to be suitable for welding such assemblies together. For this purpose, the power cylinder 103 (Fig. 10) of each of the stop mechanisms 96 and 96' (FIGS. 6 and 8) is operated to cause its piston rod 105 to axially extend from the cylinder body so as to drive the rockable arm 98' and accordingly the rockable arm 98 to tilt downwardly about the pivot pins 99 and 99', respectively. It follows that the lifting platform 88 of the lower working station 52 is caused to lower from the vertical position indicated by the dots-and-dash lines to the vertical position indicated by full lines in FIG. 10 above the lower base frame 44. As the lifting platform 88 is being thus moved downwardly, the rollers 55 and 55' on the first carrier block 53 resting on the lifting platform 88 are received on the upper faces of the guide rails 51 and 51' and, at the same time, the pin 73 on the coupling block 72 projects into the vertical bore 71 in the bracket member 70 on the carrier block 53 with the result that the first and second carrier blocks 53 and 53' are coupled together by the pins 73 and 73' on the coupling block 72. On the other hand, the power cylinder 135 of the stop means 138 illustrated in FIG. 11 is actuated to cause its piston rod 136 to be axially retracted upwardly into the cylinder body so that the locking rod 137 is upwardly withdrawn out of the vertical bore 133 in the first carrier base 111 of the upper working station 108 with the result that the first welding unit 113 is disengaged from the stop means 138.

Immediately after the first carrier block 53 is thus coupled to the second carrier block 53', the reversible motor 80 (FIG. 9) on the lower base frame 44 is put into operation driving the output shaft 85 of the reduction gear unit 84 for rotation in one direction about the axis thereof. The rotation of the output shaft 85 of the reduction gear unit 84 is transmitted to the pinion gears 86 and 86' which are thus driven to move the toothed rack members 75 and 75', respectively, along the guide rails 51 and 51' under the guidance of the series of rollers 76, 77, 78 and 79 and the series of rollers 76', 77', 78' and 79', respectively. The coupling block 72 connected to the toothed rack members 75 and 75' by means of the bracket members 74 and 74' (FIG. 8) and accordingly the first and second carrier blocks 53 and 53' connected together by the coupling block 72 are accordingly driven to move on and along the guide rails 51 and 51' until the first carrier block 53 is brought into abutting engagement with the first damper unit 87 on the supporting block 48 (FIG. 9) which is operative to dampen the mechanical shock produced by the abutting engagement of the carrier block 53 therewith. The first carrier block 53 being thus moved into the outermost lateral position thereof, the second carrier block 53' is held in the predetermined operative position thereof below the upstream branch portions 10 and 10' of the shuttle bar 9, though not shown in the drawings. After the second carrier block 53' is moved into the operative position thereof, the drive power cylinder 92 is actuated to cause the piston rod 93 to slightly extend upwardly so that the second carrier block 53' which has been received on the guide rails 51 and 51' is raised above the guide rails 51 and 51' and is received on the upper face of the lifting platform 88 with the pin 73' on the coupling block 72 withdrawn from the vertical bore 71 in the bracket member 70' on the second carrier block 53' Thereupon, the power cylinder 103 (FIG. 10) of each of the stop mechanisms 96 and 96' (FIG. 8) is operated to cause its piston rod 105 to be axially retracted, thereby causing the rockable arms 98 and 98' to turn upwardly from the inclined positions indicated by the full lines to the upright positions indicated by the dots-and-dash lines in FIG. 10. The lifting platform 88 is now received on the flat upper faces of the rockable arms 98 and 98' having their respective flat lower faces closely received on the stay members 107 and 107', respectively.

Immediately after the locking rod 137 of the stop means 138 (FIG. 11) is withdrawn from the vertical bore 133 in the first carrier base 111 as above discussed, the reversible motor 123 on the upper base frame 47 is put into operation driving the output shaft 128 of the reduction gear unit 127 for rotation in one direction about the axis thereof. The rotation of the output shaft 128 of the reduction gear unit 127 is transmitted through the sprocket wheel 129, endless chain 131 and sprocket wheel 130 to the sprocket wheel 120 and drives the chain 121 to travel along the upper lateral support beams 109 and 109'. It therefore follows that the coupling block 117 connected to the chain 121 and accordingly the first and second carrier bases 111 and 111' coupled together by the coupling block 117 are driven to move along the support beams 109 and 109' under the guidance of the series of rollers 110 until the first carrier base 111 is brought into abutting engagement with the first damper unit 132 on the support beams 109 and 109', which thus dampens the mechanical shock produced by the abutting engagement of the carrier base 111 therewith. The first welding unit F13 connected to the carrier base 111 is accordingly moved into the outermost lateral position thereof and, at the same time, the second welding unit 113' is moved into the predetermined lateral operative position thereof, though not shown in the drawings.

The second carrier block 53' of the lower working station 52 and the second welding unit 113' of the upper working station 108 are thus moved into the respective operative positions thereof and are operative to assemble the tentative engine compartment assembly E, front floor assembly Ff and rear floor assembly Fr to constitute the tentative vehicle floor structure S for an automotive vehicle of the model "B".

While a single preferred embodiment of the apparatus according to the present invention has been hereinbefore described with reference to the drawings, it should be borne in mind that such an embodiment is simply illustrative of the gist of the present invention and is subject to change and modification. If desired, for example, the embodiment herein described may be modified in such a manner that the jig assemblies 56 and 63 forming part of the lower working station 52 and the welding units 113 and 113' forming part of the upper working station 108 may be provided conversely in the upper and lower working stations 108 and 52, respectively. While, furthermore, the constructions and arrangements of the multi-spot welding machines provided in the secondary assembling stages 5a, 5b, 5c and 5d (FIG. 1) have not be herein described, it may be understood that the multi-spot welding machines 25b, 25c and 25d respectively provided in these stages are basically similar in construction and arrangement to the multi-spot welding machine 24 provided in the primary assembling stage 4.

What is claimed is:

1. An automatic vehicle-body assembling apparatus for automatically welding together an engine compartment assembly, a front floor assembly and a rear floor assembly to constitute a vehicle floor structure of an automotive vehicle, each of the engine compartment and front and rear floor assemblies being composed of a plurality of component members, comprising:
   a frame structure having a fore-and-aft direction in which the engine compartment and front and rear floor assemblies and said vehicle floor structure are to be conveyed through the apparatus and a lateral direction horizontally perpendicular to the fore-and-aft direction, the frame structure including lower and upper base frames extending in lateral direction of the frame structure at the bottom and top, respectively, of the frame structure, lower and upper working stations supported on said lower and upper base frames, respectively, each of the lower and upper working stations including carrier means movable on said lower and upper base frames in lateral directions of the frame structure, at least two jig assemblies each operative to hold in position the engine compartment and front and rear floor assemblies during each cycle of operation, the jig assemblies being carried on the carrier means of one of said lower and upper working stations, at least two welding units each operative to weld together the engine compartment and front and rear floor assemblies during each cycle of operation, the welding units being carried on the carrier means of the other of said lower and upper working stations, first drive means operative to drive the carrier means of the lower working station to move in a lateral direction of the frame structure, and second drive means operative to drive the carrier means of the upper working station to move in a lateral direction of the frame structure, said jig assemblies being movable in a lateral direction of the frame structure alternately between a predetermined operative position within the frame structure and a predetermined outermost lateral position as the carrier means carrying the jig assemblies are driven by one of the first and second drive means, said welding units being movable in a lateral direction of the frame structure alternately between a predetermined operative position within the frame structure and a predetermined outermost lateral position as the carrier means carrying the welding units are driven by one of the first and second drive means.

2. An automatic vehicle-body assembling apparatus as set forth in claim 1, further comprising lifting means operative to move the carrier means of said lower working station upwardly and downwardly over said lower base frame, said carrier means of the lower working station being vertically movable between a predetermined lowermost limit position and a predetermined uppermost limit position.

3. An automatic vehicle-body assembling apparatus as set forth in claim 2, in which said jig assemblies are carried on the carrier means of said lower working station and in which said welding units are carried on the carrier means of said upper working station.

4. An automatic vehicle-body assembling apparatus as set forth in claim 3, in which each of said jig assemblies is movable into said predetermined operative position when said lifting means is held in a condition having the carrier means of the lower working station held in said uppermost limit position thereof.

5. An automatic vehicle-body assembling apparatus as set forth in claim 3 or 4, in which the carrier means of said lower working station comprises two carrier blocks respectively having said jig assemblies carried thereon, and coupling means having said carrier blocks disconnectably coupled together.

6. An automatic vehicle-body assembling apparatus as set forth in claim 5, in which each of said carrier blocks is formed with a bore and in which said coupling means comprises a coupling block having at least two projections one of which is engageable with one of said carrier block through the bore formed therein and the other of which is engageable with the other of the carrier blocks through the bore formed therein, said carrier blocks being coupled together when said projections are held in engagement with both of the carrier blocks and being uncoupled from each other when at least one of said projections is disengaged from one of said carrier blocks.

7. An automatic vehicle-body assembling apparatus as set forth in claim 5, in which said lifting means is operative to selectively move each of said carrier blocks between said predetermined uppermost limit position and said predetermined lowermost limit position thereof.

8. An automatic vehicle body assembling apparatus as set forth in claim 6, in which said projections and said bores axially extend vertically and in which said projections are movable upwardly into said bores, respectively, said lifting means being operative to selectively move each of said carrier blocks between said predetermined uppermost limit position and said predetermined lowermost limit position, each of the carrier blocks being disengaged from each of said projections when moved upwardly from said predetermined lowermost limit position.

* * * * *